(12) United States Patent
Gyoten

(10) Patent No.: US 9,763,290 B2
(45) Date of Patent: Sep. 12, 2017

(54) SEMICONDUCTOR LIGHT SOURCE DRIVE DEVICE AND PROJECTION VIDEO DISPLAY APPARATUS

(71) Applicant: Panasonic Intellectual Property Management Co., Ltd., Osaka-shi, Osaka (JP)

(72) Inventor: Takaaki Gyoten, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 153 days.

(21) Appl. No.: 14/656,302

(22) Filed: Mar. 12, 2015

(65) Prior Publication Data

US 2015/0264760 A1    Sep. 17, 2015

(30) Foreign Application Priority Data

Mar. 17, 2014  (JP) .................................. 2014-053055
Feb. 19, 2015  (JP) .................................. 2015-030466

(51) Int. Cl.
*H05B 37/00*    (2006.01)
*H05B 33/08*    (2006.01)
*G03B 21/20*    (2006.01)

(52) U.S. Cl.
CPC ..... *H05B 33/0815* (2013.01); *G03B 21/2033* (2013.01); *G03B 21/2053* (2013.01)

(58) Field of Classification Search
CPC ............ H05B 33/0815; H05B 33/0839; H05B 33/0845; H05B 37/0227
USPC ........................................ 315/186, 193, 307
See application file for complete search history.

(56) References Cited

U.S. PATENT DOCUMENTS

| 8,941,328 B2* | 1/2015 | Wu | H05B 33/0812 315/297 |
| 2009/0295776 A1* | 12/2009 | Yu | H05B 33/0818 345/212 |
| 2010/0327835 A1* | 12/2010 | Archibald | H05B 33/0818 323/282 |
| 2011/0109243 A1* | 5/2011 | Kim | H05B 33/0812 315/294 |

(Continued)

FOREIGN PATENT DOCUMENTS

| JP | 2009-016460 | 1/2009 |
| JP | 2009-295791 | 12/2009 |

*Primary Examiner* — Tung X Le
(74) *Attorney, Agent, or Firm* — Hamre, Schumann, Mueller & Larson, P.C.

(57) ABSTRACT

The semiconductor light source drive device according to the present disclosure includes: a switching power source that is connected in series with a semiconductor light source element and a constant current circuit to output a predetermined voltage to the semiconductor light source element and the constant current circuit; a detection circuit that detects a voltage at a connecting point between the semiconductor light source element and the constant current circuit; and a controller that controls the voltage output from the switching power source based on the voltage detected by the detection circuit, and controls a current value of the constant current circuit based on a switching signal. The controller, prior to varying the current value of the constant current circuit, varies the voltage output from the switching power source in accordance with an amount to be varied in the current value of the constant current circuit.

7 Claims, 5 Drawing Sheets

(56) References Cited

U.S. PATENT DOCUMENTS

2015/0245434 A1* 8/2015 Xu ................... H05B 33/0815
315/291

* cited by examiner

SEMICONDUCTOR LIGHT SOURCE DRIVE DEVICE AND PROJECTION VIDEO DISPLAY APPARATUS

BACKGROUND

Technical Field

The present disclosure relates to a semiconductor light source drive device that supplies a current to an assembly formed of series-connected semiconductor light source elements to drive the assembly.

Description of the Related Art

Patent Literature 1 discloses a semiconductor light source drive device that includes a plurality of drive circuits. The drive circuits each include: a constant current circuit that is made up of an operational amplifier, a current sensing resistor, and a FET (field effect transistor); and a voltage detection circuit. An LED (light emitting diode) is connected between drain of the FET and a power source. The voltage detection circuit is connected with both ends of the LED to detect a voltage across the LED. The plurality of drive circuits are connected in parallel with the identical power source. The plurality of voltage detection circuits respectively detect voltages across the LEDs, such that a voltage of the power source is controlled in accordance with the highest one of the detected voltages. This makes it possible to achieve a reduction in loss of a voltage at the FET which is essential in controlling the current. Thus, an efficient semiconductor light source drive device is obtained.

CITATION LIST

Patent Literature

Patent Literature 1: Unexamined Japanese Patent Publication No. 2009-295791

SUMMARY

The present disclosure provides a semiconductor light source drive device that prevents a delay in increasing a current flowing through a semiconductor light source element, in the case where power is supplied from a switching power source.

The semiconductor light source drive device according to the present disclosure includes: a switching power source that is connected in series with a semiconductor light source element and a constant current circuit to output a predetermined voltage to the semiconductor light source element and the constant current circuit; a detection circuit that detects a voltage at a connecting point between the semiconductor light source element and the constant current circuit; and a controller that controls the voltage output from the switching power source based on the voltage detected by the detection circuit, and controls a current value of the constant current circuit based on a switching signal. The controller, prior to varying the current value of the constant current circuit, varies the voltage output from the switching power source in accordance with an amount to be varied in the current value of the constant current circuit.

The semiconductor light source drive device according to the present disclosure can prevent a delay in increasing a current flowing through a semiconductor light source element, in the case where power is supplied from a switching power source.

DETAILED DESCRIPTION OF THE PREFERRED EMBODIMENTS

Hereinafter, preferred embodiments will be described in detail with reference to the drawings as appropriate. Note that, an unnecessarily detailed description may be omitted. For example, a detailed description of an already well-known matter may not be given and a description of a substantially identical structure may not be repeated. This is to avoid unnecessary redundancy in the following description and to facilitate understanding by a person skilled in the art.

Note that, the accompanying drawings and the following description are provided for the purpose of allowing a person skilled in the art to fully understand the present disclosure, and they are not intended to limit the subject as defined by the claims.

First Exemplary Embodiment

In the following, a description will be given of a first exemplary embodiment with reference to FIGS. 1 to 4.

[1-1. Structure]

Figure 1:
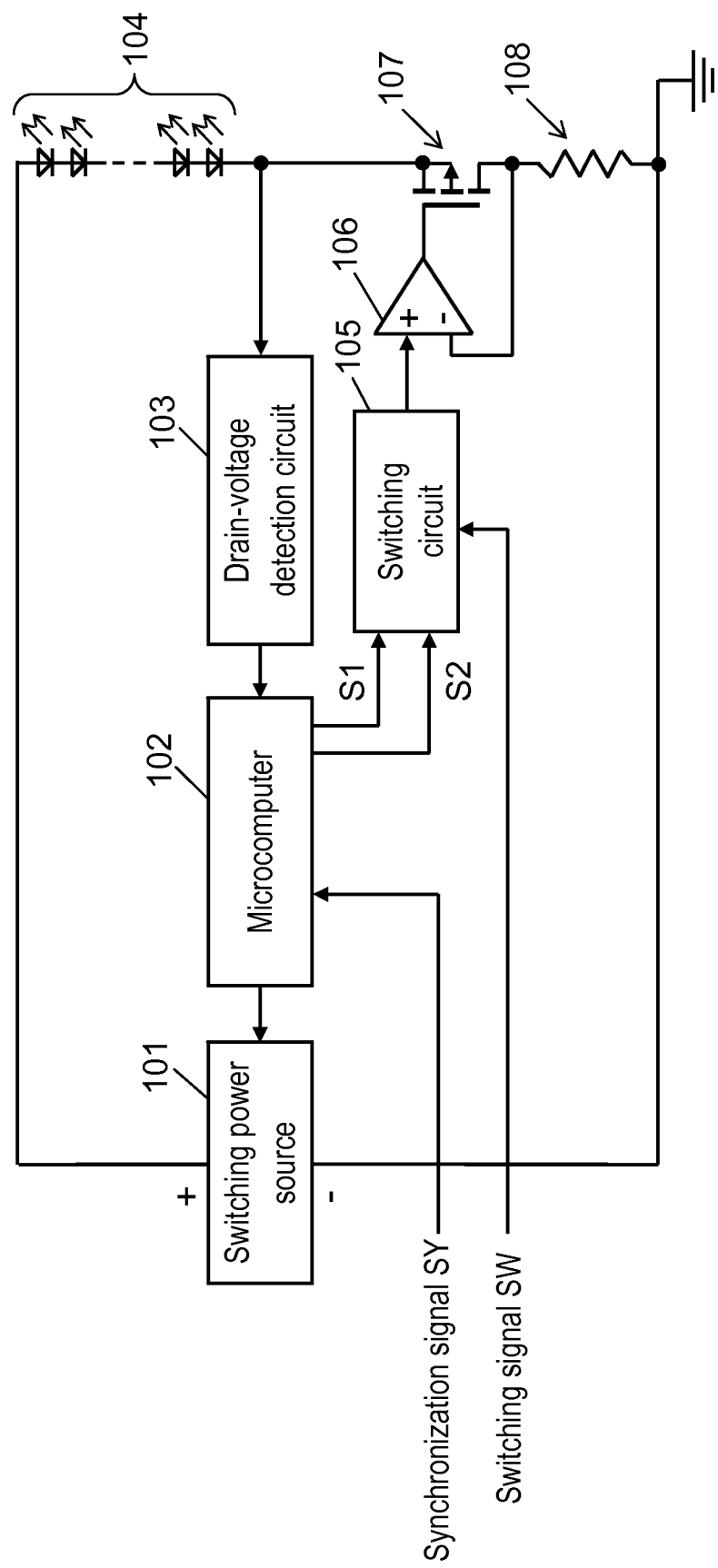
FIG. 1 is a block diagram of a semiconductor light source drive device according to a first exemplary embodiment.

FIG. 1 is a block diagram of a semiconductor light source drive device.

As shown in FIG. 1, the semiconductor light source drive device includes switching power source 101, microcomputer 102, drain-voltage detection circuit 103, series-connected laser diode (LD) assembly 104 as a plurality of semiconductor light source elements, switching circuit 105 that switches between two inputs to output one of the inputs, operational amplifier 106, FET (field effect transistor) 107, and current sensing resistor 108. Although an N-channel field effect transistor is used as FET 107 in the present exemplary embodiment, it is also possible to use a P-channel field effect transistor.

The positive (+) side of switching power source 101 is connected with one end of series-connected LD assembly 104. Other end of series-connected LD assembly 104 is connected with drain of FET 107. Source of FET 107 is connected with negative (−) side of switching power source 101 via current sensing resistor 108.

Although LDs are used as the semiconductor light source elements in the present exemplary embodiment, it is also possible to employ light emitting diodes (LEDs).

The semiconductor light source drive device shown in FIG. 1 is applied to an illumination apparatus for a projector (a projection video display apparatus) that uses a one-chip DMD (digital mirror device) as an optical modulator.

[1-2. Operation]

With reference to FIGS. 1 to 4, a description will be given of the operation of the semiconductor light source drive device structured as described above.

Since series-connected LD assembly 104, the channel between drain and source of FET 107, and current sensing resistor 108 are connected in series, a current identical to that flowing through series-connected LD assembly 104 flows through current sensing resistor 108. The current is converted by current sensing resistor 108 into a voltage that is proportional to the current value. The voltage detected by current sensing resistor 108 and the output of switching circuit 105 are processed by operational amplifier 106 and thereafter amplified, to drive gate of FET 107. Normally, the amplification rate of operational amplifier 106 is extremely great. Therefore, such a structure allows the gate voltage of FET 107 to rise until the voltage across current sensing resistor 108 and the output voltage of switching circuit 105 become substantially equal to each other. That is, a current corresponding to the output of switching circuit 105 flows through the circuit in which series-connected LD assembly 104, FET 107, current sensing resistor 108, and switching power source 101 are connected in series. Operational amplifier 106, FET 107, and current sensing resistor 108 operate as a constant current circuit.

In order to control the current of this series circuit by the resistance value of FET 107 to achieve the target current value (which is referred to as It), the current of the series circuit must achieve target current value It in the state where the resistance value of FET 107 is greater than the smallest possible resistance value that FET 107 can assume (which resistance value is referred to as the minimum ON resistance value). That is, the drain-source voltage (which is referred to as Vds) must be greater than the product of target current value It and the minimum ON resistance value of FET 107 (which resistance value is referred to as Rfetmin) (Formula (1)).

$$Vds > It * Rfetmin \quad (1)$$

The product of target current value It and minimum ON resistance value Rfetmin of FET 107 is referred to as minimum drain-source voltage Vdsmin.

Voltage Vsmin across current sensing resistor 108 in a period where a current assuming target current value It flows is expressed by the following Formula (2) where Rs is the resistance value of current sensing resistor 108.

$$Vsmin = It * Rs \quad (2)$$

Drain-source voltage Vds of FET 107 in a period where a current assuming target current value It flows is expressed by the following formula (3) where Ve is the output voltage of switching power source 101, Vf is the voltage across series-connected LD assembly 104, and Vs=Vsmin is the voltage across current sensing resistor 108.

$$Vds = Ve - Vf - Vsmin \quad (3)$$

As described above, since the condition of Formula (1) must be satisfied, the condition of the following Formula (4) must be satisfied.

$$Vds > Vdsmin \quad (4)$$

Then, from Formulae (3) and (4), the conditions of the following Formulae (5) must be satisfied.

$$Ve - Vf - Vsmin > Vdsmin$$

$$Ve > Vf + Vsmin + Vdsmin \quad (5)$$

On the other hand, when output voltage Ve of switching power source 101 increases under the foregoing conditions, such an increase entirely contributes toward increasing drain-source voltage Vds of FET 107. Thus, the power loss at FET 107 increases. Accordingly, it is desirable that Ve is close to the condition of the following Formula (6) as much as possible.

$$Ve = Vf + Vsmin + Vdsmin \quad (6)$$

Figure 2:
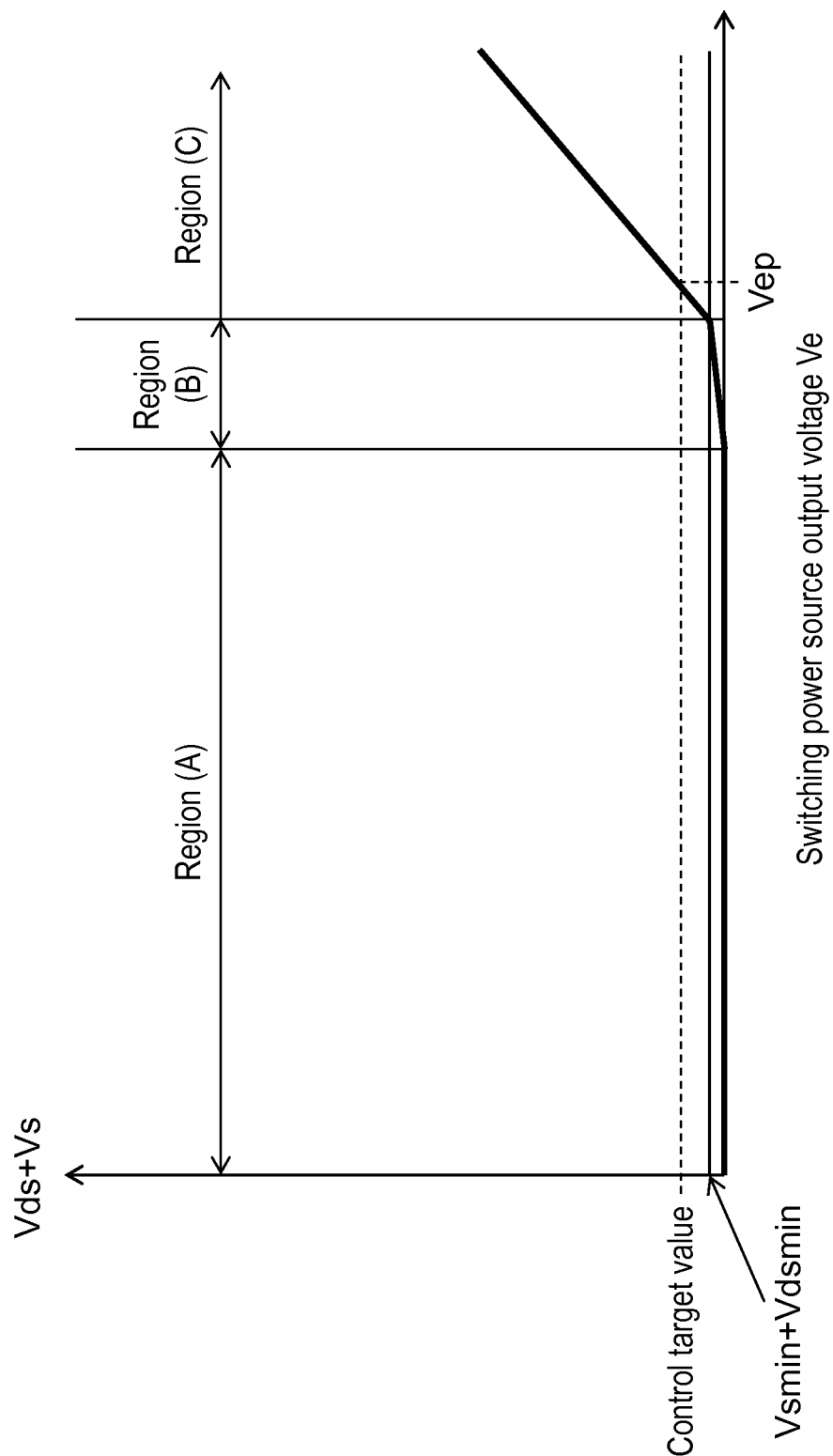
FIG. 2 is a diagram for describing the operation of the semiconductor light source drive device according to the first exemplary embodiment.

FIG. 2 shows the relationship between output voltage Ve of switching power source 101 and the sum (Vds+Vs) of drain-source voltage Vds of FET 107 and voltage Vs across current sensing resistor 108.

When output voltage Ve of switching power source 101 is small, the target current does not flow through current sensing resistor 108. Therefore, operational amplifier 106 applies the maximum voltage to FET 107 so as to cause the current to flow. Consequently, the resistance value of FET 107 assumes the minimum possible ON resistance value, i.e., Rfetmin.

Region (A) shown in FIG. 2 is the region where the voltage applied to the semiconductor light source is low and hence little current flows. In region (A), since output voltage Ve of switching power source 101 is lower than the voltage at which a current starts to greatly flow through series-connected LD assembly 104, little current flows through the circuit. Accordingly, almost the entire output voltage Ve of switching power source 101 is applied to both ends of assembly 104, whereby the sum (Vds+Vs) of drain-source voltage Vds of FET 107 and voltage Vs across current sensing resistor 108 becomes substantially zero.

Region (B) shown in FIG. 2 is the region where a current varies depending on output voltage Ve of switching power source 101. Region (B) is the region where output voltage Ve of switching power source 101 becomes further greater and a current starts to greatly flow through assembly 104. By this current, a voltage proportional to the flowing current is generated at the channel between drain and source of FET 107 and at current sensing resistor 108. In this state, since the current flowing through current sensing resistor 108 is still smaller than the target current value, the resistance value of FET 107 remains at minimum ON resistance value Rfetmin. Further, since a small resistance value is normally employed for current sensing resistor 108, Vds+Vs is extremely small. Similar operation is performed until output voltage Ve of switching power source 101 becomes further higher to increase the current flowing through current sensing resistor 108 to thereby cause the current to achieve the target current value. The maximum voltage of Vds+Vs in this region (B) is the sum (Vsmin+Vdsmin) of voltage Vsmin across current sensing resistor 108 and minimum drain-source voltage Vdsmin.

Region (C) shown in FIG. 2 is the region where a constant current flows. As shown in region (C), when the target current flows through current sensing resistor 108, operational amplifier 106 operates to control the resistance value of FET 107 such that the current value at FET 107 is maintained.

When the flowing current is constant, voltage Vs across current sensing resistor 108 is constant. Also, voltage Vf across series-connected LD assembly 104 does not change unless the temperature or the like of series-connected LD assembly 104 changes. Accordingly, when output voltage Ve of switching power source 101 increases, such an increase entirely contributes toward an increase in drain-source voltage Vds of FET 107, whereby Vds+Vs rapidly increases.

In view of the foregoing characteristics, as shown in FIG. 2, the value of Vds+Vs is detected, and output voltage Ve of switching power source 101 is controlled such that the detected value attains the control target value that slightly exceeds Vsmin+Vdsmin. Output voltage Ve of switching power source 101 when the value of Vds+Vs attains the control target value is voltage Vep. Thus, the current flowing through current sensing resistor 108 can be controlled to attain the target current value. Further, an increase in drain-source voltage Vds can be suppressed to minimize the loss at FET 107.

That is, drain-voltage detection circuit 103 shown in FIG. 1 detects voltage (Vds+Vs) being the sum of drain-source voltage Vds of FET 107 and voltage Vs across current sensing resistor 108, and inputs the detected voltage to microcomputer 102. Microcomputer 102 controls switching power source 101 such that the value of Vds+Vs attains the control target value being the voltage value that slightly exceeds Vsmin+Vdsmin, as described above.

In this manner, while minimizing the loss at FET 107, a constant current can be supplied to assembly 104 in which a plurality of LDs are connected in series.

Meanwhile, as shown in FIG. 1, switching circuit 105 switches, in accordance with an externally input switching signal SW, between switching inputs S1 and S2 provided from microcomputer 102. Then, switching circuit 105 outputs S1 or S2 to operational amplifier 106.

Figure 3:
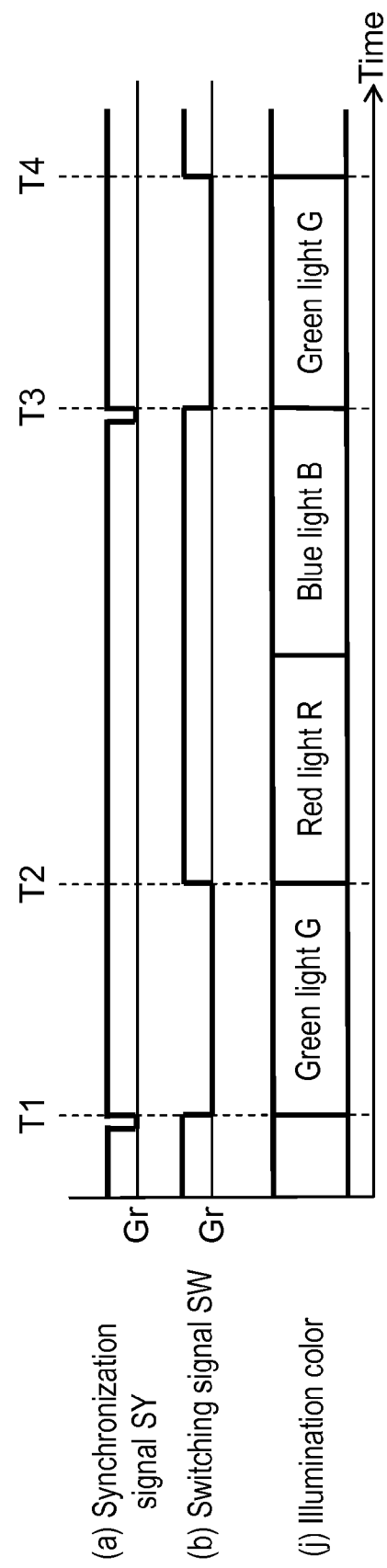
FIG. 3 is an explanatory diagram of signals that are input to the semiconductor light source drive device according to the first exemplary embodiment.

FIG. 3 shows the relationship among (a) synchronization signal SY that is input to microcomputer 102, (b) switching signal SW that is input to switching circuit 105, and (j) illumination color.

Here, in the case where the LDs are LDs that emit blue laser light, red color light R and green color light G can each be obtained through waveform conversion with a phosphor using the blue color light obtained from the LDs as the excitation light. Blue color light B can be obtained using the light from the LDs as it is. In connection with the brightness of such illumination colors, for example as shown in FIG. 3, when it is desired to raise the intensity of the light source in generating red color light R and blue color light B so as to be higher than the intensity of green color light G, control is performed to raise the brightness of the LDs in the period from timing T2 to timing T3 being the emission period of red color light R and blue color light B than in the period from timing T1 to timing T2 being the emission period of green color light G. Timing T3 corresponds to timing T1 and timing T4 corresponds to timing T2.

Figure 4:
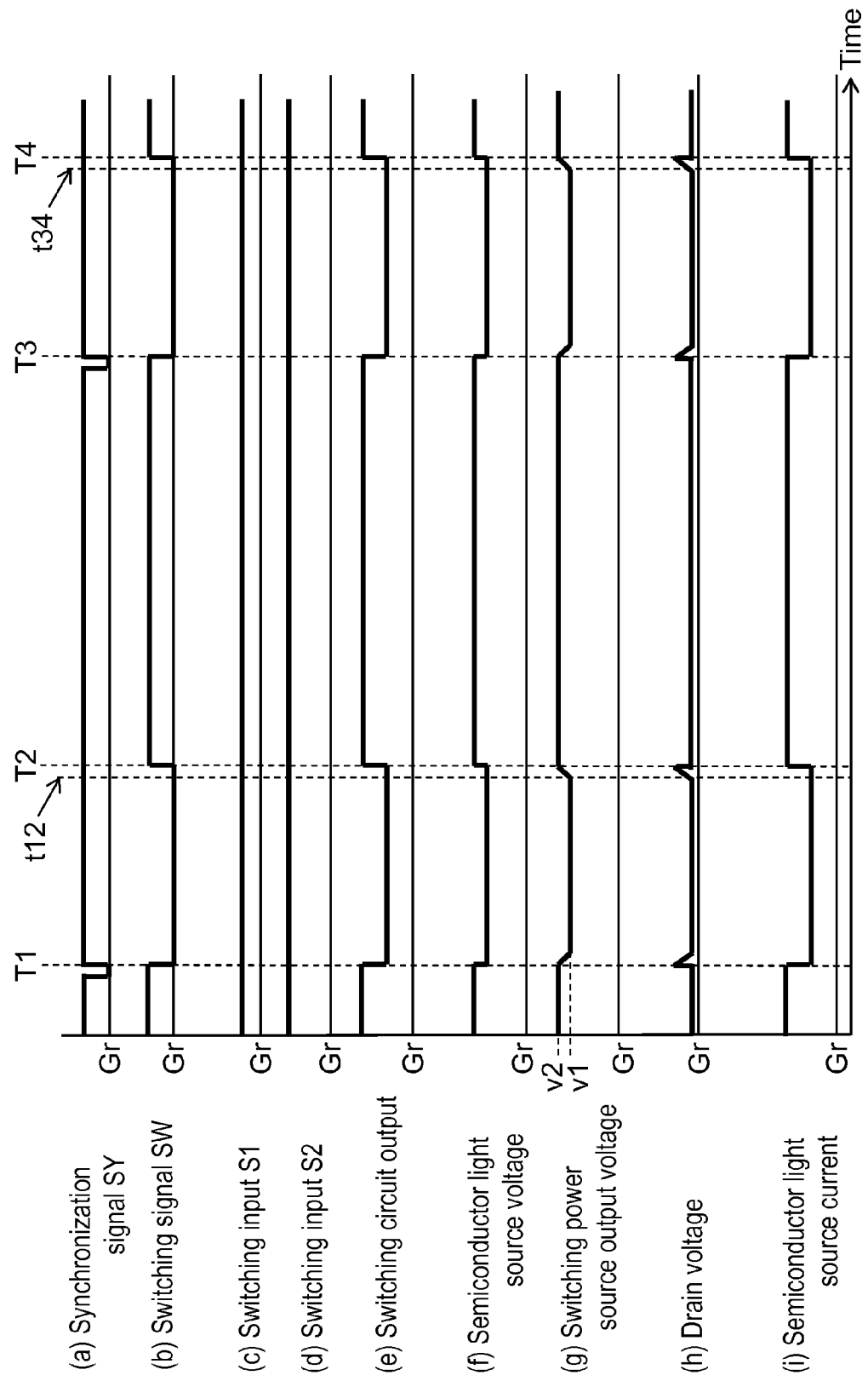
FIG. 4 is a signal waveform diagram showing the operation of the semiconductor light source drive device according to the first exemplary embodiment.

FIG. 4 is a signal waveform diagram showing the operation of the semiconductor light source drive device. In the diagram, Gr represents the reference potential.

As represented by the waveforms of (a) synchronization signal SY and (b) switching signal SW shown in FIG. 4, synchronization signal SY and switching signal SW for the video signals modulated at a DMD are output with a predetermined temporal relationship. Here, synchronization signal SY is used as the reference signal, and switching signal SW input to switching circuit 105 switches from high to low at timing T1 at which synchronization signal SY falls. Further, switching signal SW switches from low to high at timing T2.

As represented by the waveforms of (c) switching input S1 and (d) switching input S2 shown in FIG. 4, microcomputer 102 provides switching circuit 105 with two signals of different levels for setting the target current value, namely switching input S1 and switching input S2. Switching circuit 105 switches between switching input S1 and switching input S2 based on input switching signal SW, and provides input S1 or S2 to operational amplifier 106. That is, as the waveform of (e) switching circuit output shown in FIG. 4, switching circuit 105 provides the level of switching input S1 when input switching signal SW is low, and provides the level of switching input S2 when input switching signal SW is high. Operational amplifier 106 drives FET 107 in accordance with such an output selected by switching circuit 105.

In this manner, control is performed such that switching of the target current value from low-level switching input S1 to high-level switching input S2 increases the output voltage of operational amplifier 106 and reduces ON resistance of FET 107, to increase the current to achieve the target current value based on switching input S2.

At this timing of switching the input, if output voltage Ve of switching power source 101 is not raised, then operational amplifier 106 raises the output voltage in order to increase the current, thereby reducing the resistance value of FET 107. However, since the resistance value of FET 107 cannot be reduced to be smaller than the minimum ON resistance value, the resistance value of FET 107 assumes the minimum ON resistance value. Eventually, what flows through series-connected LD assembly 104 is a current determined by output voltage Ve of switching power source 101, the minimum ON resistance value of FET 107, the resistance value of current sensing resistor 108, and voltage Vf across series-connected LD assembly 104. At this time, the value of the current flowing through series-connected LD assembly 104 assumes a value being lower than the target current value. As a result, a desired brightness cannot be obtained from series-connected LD assembly 104. Accordingly, at the timing where the target current value switches from switching input S1 to switching input S2, output voltage Ve of switching power source 101 must attain a voltage with which a desired target current value can be obtained.

However, switching power source 101 is equipped with a smoothing capacitor at its output. Therefore, even when it is attempted to change output voltage Ve by control of microcomputer 102, output voltage Ve cannot be sharply changed.

Therefore, in the case where control of raising output voltage Ve of switching power source 101 is performed at timing T2 based on switching signal SW, rise of the current flowing through series-connected LD assembly 104 is delayed by the time taken by power source voltage Ve of switching power source 101 to rise. Accordingly, during the period of such a delay, the current flowing through the semiconductor light source cannot attain the target current value as described above. Thus, the brightness of the semiconductor light source becomes disadvantageously low.

In the case where the semiconductor light source drive device is used as an illumination apparatus for a projection video display apparatus, such insufficient brightness is not preferable, because it undesirably influences the projected video, e.g., reducing the linearity of the video brightness.

In the semiconductor light source drive device shown in FIG. 1, as represented by the waveform of (g) switching power source output voltage in FIG. 4, microcomputer 102 raises, with reference to synchronization signal SY input to microcomputer 102, output voltage Ve of switching power source 101 already at timing t12 which precedes timing T2 at which switching signal SW changes, thereby providing for an increase in the output current.

That is, microcomputer 102 previously stores the time required for output voltage Ve of switching power source 101 to rise from v1 to v2 when the input is switched from switching input S1 to switching input S2 based on switching signal SW. Accordingly, microcomputer 102 starts control of switching power source 101 at timing t12 to raise output voltage Ve, such that output voltage Ve attains v2 at timing T2 at which switching input S1 is switched to switching input S2. The relationship between timing t34 and timing T4 is similar to the relationship between timing t12 and timing T2.

Controlling in this manner, as represented by the waveforms of (f) semiconductor light source voltage and (i)

semiconductor light source current shown in FIG. 4, the voltage applied to series-connected LD assembly 104 rises at timing T2 at which switching input S1 is switched to switching input S2 based on switching signal SW, whereby the current flowing through assembly 104 rises to attain the target current value.

Note that, when such control is performed, as represented by the waveform of (h) drain voltage shown in FIG. 4, after timing T1 and before timing T2 at which switching signal SW changes, drain-source voltage Vds of FET 107 rises for a short period. However, since each period is extremely short, an increase in the loss at FET 107 associated with the rise of voltage Vds is very small. Further, at timing T1 and timing T3 at which the output of switching circuit 105 switches from switching input S2 to switching input S1, it is not necessary to lower the output voltage of the switching power source at earlier timing.

[1-3. Effect]

As described above, according to the present exemplary embodiment, the power consumption of FET 107 can be reduced without causing any delay in increasing a current flowing through a plurality of series-connected LDs 104 as a semiconductor light source.

Second Exemplary Embodiment

In the following, a description will be given of a second exemplary embodiment with reference to FIG. 5.

[2-1. Structure]

Figure 5:
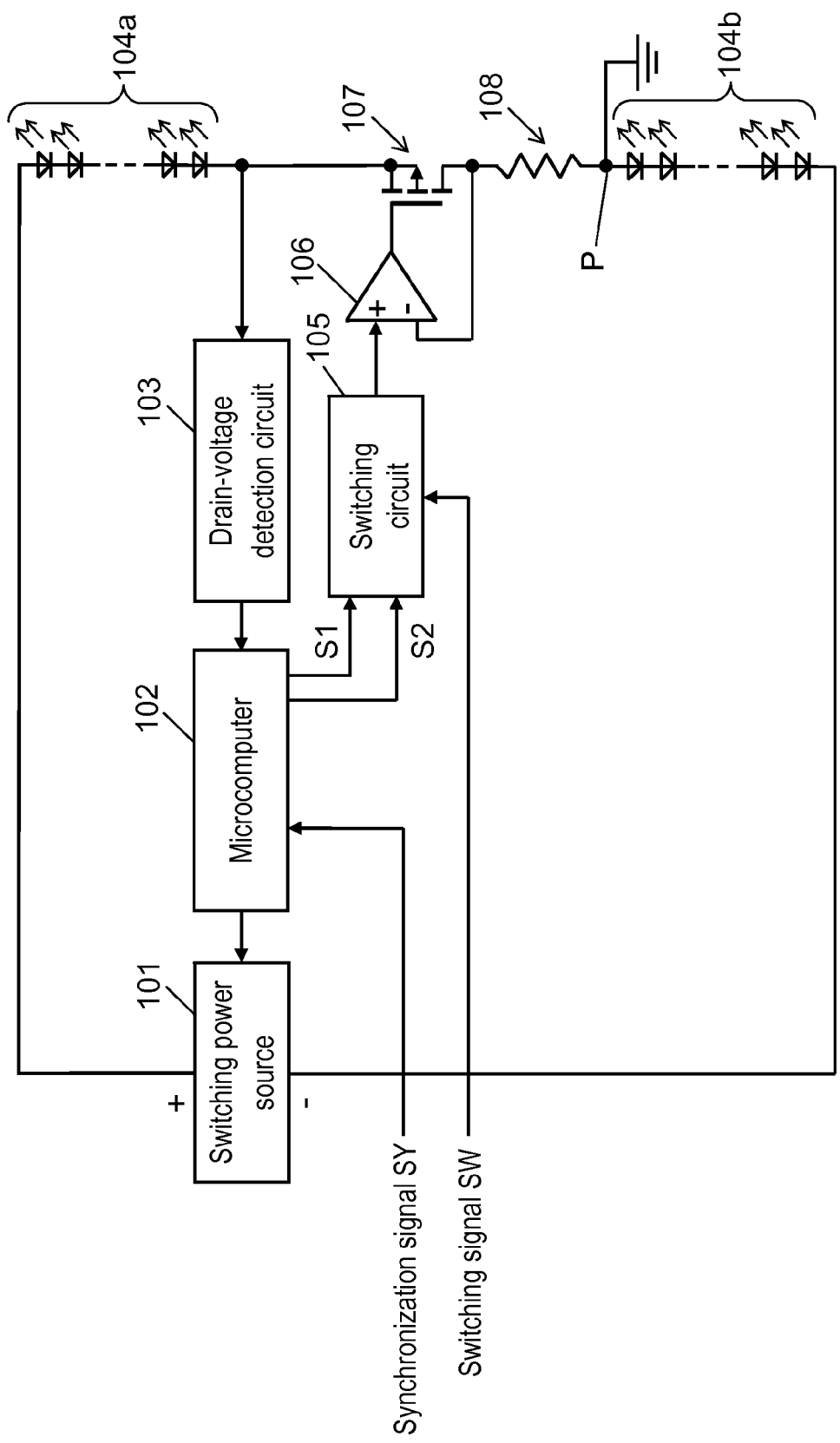
FIG. 5 is a block diagram of a semiconductor light source drive device according to a second exemplary embodiment.

FIG. 5 is a block diagram of a semiconductor light source drive device according to the second exemplary embodiment.

The semiconductor light source drive device according to the second exemplary embodiment is different from the semiconductor light source drive device according to the first exemplary embodiment in that a plurality of series-connected LD assemblies 104a and 104b each being a semiconductor light source are respectively connected to the positive side and the negative side of switching power source 101, and the output of switching power source 101 is floating. That is, assembly 104a is inserted between the positive side of switching power source 101 and FET 107, and assembly 104b is inserted between current sensing resistor 108 and the negative side of switching power source 101. Further, connecting point P between current sensing resistor 108 and assembly 104b is grounded.

[2-2. Operation]

The semiconductor light source drive device according to second exemplary embodiment operates similarly to the semiconductor light source drive device according to the first exemplary embodiment except for the following point. That is, a current identical to that flowing through assembly 104a inserted between the positive side of switching power source 101 and FET 107 flows through assembly 104b inserted between current sensing resistor 108 and the negative side of switching power source 101.

[2-3. Effect]

According to the second exemplary embodiment, the effect similar to that obtained by the semiconductor light source drive device according to the first exemplary embodiment can be obtained. Further, a greater number of semiconductor light source elements can be driven without increasing the potential difference between the semiconductor light source and the ground point.

Further, assembly 104a and assembly 104b may be identical to each other or different from each other. For example, for the purpose of enhancing the brightness of the semiconductor light source, assembly 104b can be added to the semiconductor light source drive device according to the first exemplary embodiment. Further, for the purpose of obtaining the brightness similar to the brightness of the semiconductor light source of the semiconductor light source drive device according to the first exemplary embodiment, a plurality of LDs forming assembly 104 according to the first exemplary embodiment may be halved to serve as assemblies 104a and 104b.

Other Exemplary Embodiments

In the foregoing, the first and second exemplary embodiments have been described to exemplify the technique disclosed in the present application. However, the technique of the present disclosure is not limited thereto, and can be applied to any exemplary embodiment in which modification, replacement, addition, or omission is made as appropriate. Further, it is also possible to form a new exemplary embodiment by combining the constituents described in connection with the first and second exemplary embodiments.

For example, although FET 107 is disclosed as a current control device in the first and second exemplary embodiments, the present disclosure is not limited thereto. For example, a bipolar transistor, an IGBT or the like can be used.

Further, although two target current values can be set using switching inputs S1 and S2 that are input signals provided from microcomputer 102 to switching circuit 105 in the first and second exemplary embodiments, it is also possible to set three or more target current values using three or more switching inputs.

The present disclosure is applicable to a semiconductor light source drive device that drives a plurality of semiconductor light source elements connected in series. For example, the present disclosure is applicable to a light source for a projector, a light source for illumination or the like.

What is claimed is:

1. A semiconductor light source drive device comprising:
a semiconductor light source element;
a constant current circuit that is connected in series with the semiconductor light source element;
a switching power source that is connected in series with the semiconductor light source element and the constant current circuit to output a predetermined voltage to the semiconductor light source element and the constant current circuit;
a detection circuit that detects a voltage at a connecting point between the semiconductor light source element and the constant current circuit; and
a controller that controls the voltage output from the switching power source based on the voltage detected by the detection circuit, and a current value of the constant current circuit based on a switching signal, wherein
the controller, prior to varying the current value of the constant current circuit, varies the voltage output from the switching power source at a predetermined timing that precedes a switching timing of the switching signal, in accordance with an amount to be varied in the current value of the constant current circuit.

2. The semiconductor light source drive device according to claim 1, wherein the semiconductor light source element is connected to each of a positive side and a negative side of the switching power source.

3. A projection video display device comprising the semiconductor light source drive device according to claim 1.

4. The semiconductor light source drive device according to claim 1, wherein the predetermined timing is stored in the controller.

5. A semiconductor light source drive device comprising:
a light source element assembly that is made up of a plurality of semiconductor light source elements connected in series;
a constant current circuit that includes a field effect transistor having a drain connected with the light source element assembly, a source connected with a current sensing resistor, and a gate connected with an output of an operational amplifier;
a switching power source that has a positive side connected with the light source element assembly, and a negative side connected with the current sensing resistor of the constant current circuit;
a drain-voltage detection circuit that detects a drain voltage of the field effect transistor;
a switching circuit that switches to one of a plurality of input signals based on a switching signal, and supplies the switched input signal to the operational amplifier; and
a microcomputer that controls the switching power source based on a detection signal from the drain-voltage detection circuit, and outputs a plurality of current value set signals as the input signals for the switching circuit, wherein
the microcomputer, prior to the switching of the current value set signals by the switching circuit, controls the switching power source so as to vary an output based on a reference signal having a predetermined temporal relationship with the switching signal.

6. The semiconductor light source drive device according to claim 5, further comprising:
another light source element assembly that is connected between the current sensing resistor and the negative side of the switching power source.

7. A projection video display apparatus comprising the semiconductor light source drive device according to claim 5.

* * * * *